(12) United States Patent
Lozano

(10) Patent No.: US 9,797,759 B2
(45) Date of Patent: Oct. 24, 2017

(54) INTEGRATED PIPE PRESSURE AND TEMPERATURE SENSORS AND RELATED METHODS

(71) Applicant: The Boeing Company, Chicago, IL (US)

(72) Inventor: Martin Lozano, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/994,588

(22) Filed: Jan. 13, 2016

(65) Prior Publication Data
US 2017/0199064 A1    Jul. 13, 2017

(51) Int. Cl.
*G01F 1/56*    (2006.01)
*G01F 15/14*    (2006.01)

(52) U.S. Cl.
CPC ............... *G01F 1/56* (2013.01); *G01F 15/14* (2013.01)

(58) Field of Classification Search
CPC ............... G01F 1/44; G01F 1/06; G01F 1/32; G01F 1/708
USPC ............... 73/861.64, 861.87, 861.24, 861.05
See application file for complete search history.

(56) References Cited

U.S. PATENT DOCUMENTS

| | | | | |
|---|---|---|---|---|
| 4,590,805 A | * | 5/1986 | Baird | ............... G01F 1/06 73/861.77 |
| 5,583,476 A | * | 12/1996 | Langford | ............... G01B 7/18 338/211 |
| 6,347,911 B1 | * | 2/2002 | Blair | ............... E01D 19/02 24/462 |
| 2007/0000333 A1 | * | 1/2007 | Brugger | ............... G01L 7/024 73/714 |
| 2009/0173166 A1 | * | 7/2009 | Genosar | ............... G01F 1/708 73/861.05 |
| 2009/0199657 A1 | * | 8/2009 | Inagaki | ............... F15D 1/001 73/861.64 |
| 2010/0192701 A1 | * | 8/2010 | Schmitt | ............... G01F 1/3245 73/861.24 |

OTHER PUBLICATIONS

Honeywell, "Pressure Sensors—Board Mount," available at https://sensing.honeywell.com/products/pressure_boardmount_sensors (last accessed Apr. 21, 2017), 2 pages.
Tarantola, Andrew, "These Wires Can Stretch 800 Percent Thanks to Conductive Metal Goo," Dec. 19, 2012, available at http://gizmodo.com/5969917/these-wires-can-stretch-800-percent-thanks-to-conductive-metal-goo (2 pages).
Gzi, "GZE Tensioned Snake Shape Set Super Elastic NiTi Wire," Jan. 5, 2011, available at https://www.youtube.com/watch?v=3TIAootcZ40 (Video).

(Continued)

*Primary Examiner* — Jewel V Thompson
(74) *Attorney, Agent, or Firm* — Hanley, Flight & Zimmerman, LLC

(57) ABSTRACT

Integrated pipe pressure and temperature sensors and related methods are disclosed herein. An example apparatus includes a housing including an opening to provide a fluid flow path. The fluid flow path is to be coaxially aligned with a fluid flow path of a pipe when the housing is coupled to the pipe. The example apparatus includes a sensor disposed in the housing. The sensor includes an electrically conductive deformable material.

19 Claims, 8 Drawing Sheets

(56) References Cited

OTHER PUBLICATIONS

Minnesota Wire Company, "iStretch," available at http://www.istretchcable.com/ (last accessed Jan. 11, 2016) (Product website).
Parker Hannifin, "About EAP," available at http://video.parker.com/Parker_Videos/Group/FCG/ProductCapabilities/EAP-Technology.html (last accessed Jan. 11, 2016) (Video).
Zurich University of the Arts, "Electroactive PolymersPart 1: Shower Hose Stretching Mechanism Video Tutorial," Jan. 23, 2013, available at https://www.youtube.com/watch?v=uw8FLgiXsmk (Video).
Onyx Valve, "Pressure Sensors—PSW," available at http://www.onyxvalve.com/pressure-sensors/pressure-sensor-psw/ (last accessed Jan. 11, 2016) (3 pages).

\* cited by examiner

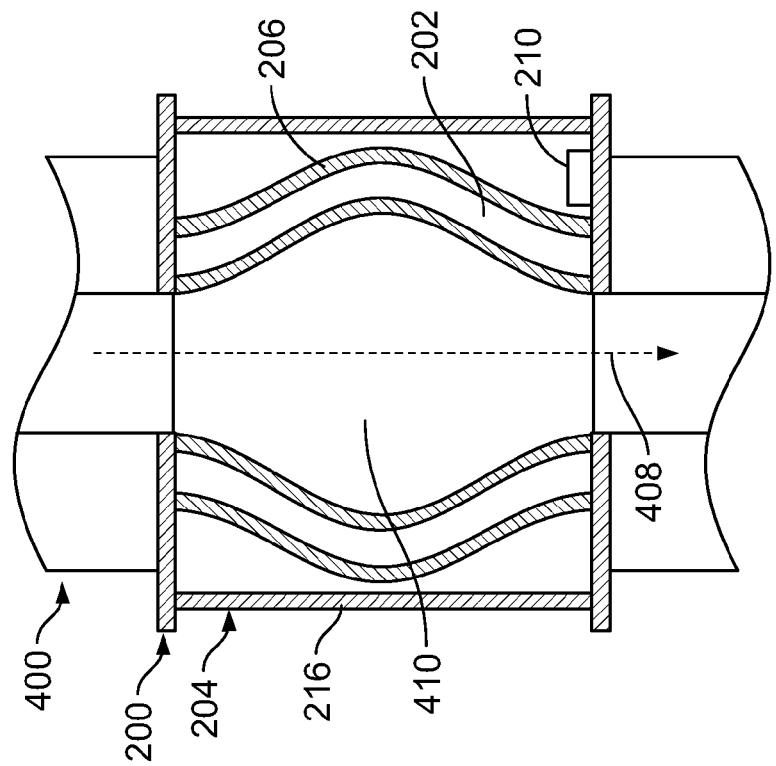
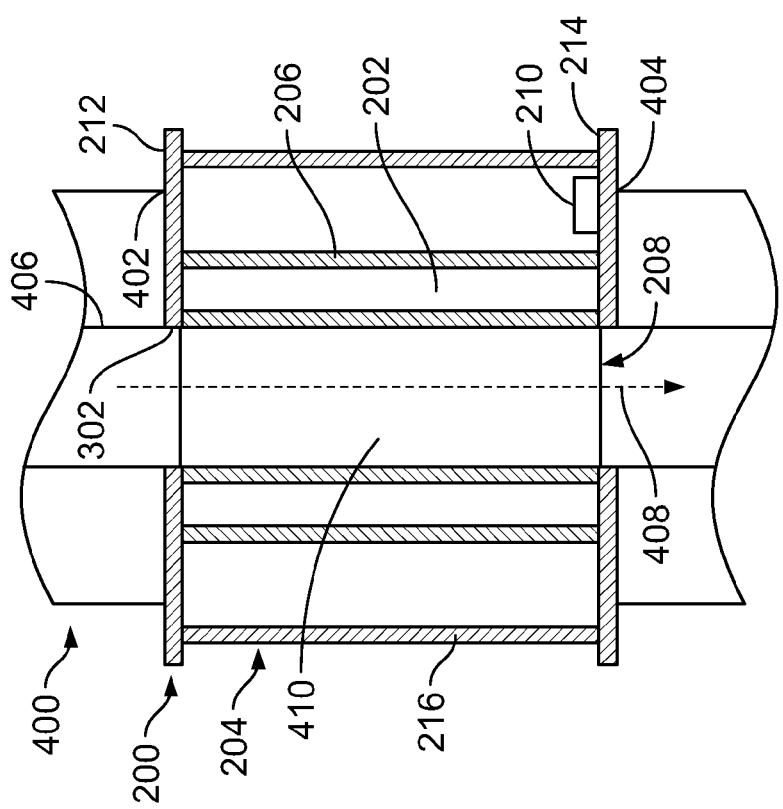

INTEGRATED PIPE PRESSURE AND TEMPERATURE SENSORS AND RELATED METHODS

FIELD OF THE DISCLOSURE

This disclosure relates generally to sensors and, more particularly, to integrated pipe pressure and temperature sensors and related methods.

BACKGROUND

Systems involving applications of fluids such as fuel delivery systems, automated sealing and painting applications, injection molding systems, blood and fluid injections and extractions for medical purposes, and food and beverage manufacturing often require delivery of fluids at a substantially constant flow rate. Pressure and temperature properties of a fluid can be measured during system operations to monitor fluid flow rate. Fluid pressure and temperature measurements can be made using sensors as the fluid flows through a pipe within the system.

SUMMARY

An example apparatus disclosed herein includes a housing including an opening to provide a fluid flow path. The fluid flow path is to be coaxially aligned with a fluid flow path of a pipe when the housing is coupled to the pipe. The example apparatus includes a sensor disposed in the housing. The sensor includes an electrically conductive deformable material.

Also disclosed herein is an example method for sensing physical changes in a fluid flowing through a pipe. The example method includes detecting a change in a shape of a sensor coupled to the pipe from a first shape to a second shape in response to the fluid flow. The example method includes measuring one of a voltage across or a current flowing through the sensor. The example method includes determining a pressure of the fluid based on the change in the shape of the sensor and one of the voltage or the current.

Another example apparatus disclosed herein includes a sensor configured to be coupled to a pipe. The sensor is configured to change from a first shape to a second shape when a fluid flows through the sensor from the pipe. The example apparatus includes a circuit operatively coupled to the sensor. The circuit is to measure one of a voltage across or a current through the sensor having the second shape. The example apparatus includes a controller including a processor, the controller to determine at least one of a pressure or a temperature of the fluid in the pipe based on the one of the measured voltage or current and the second shape.

BRIEF DESCRIPTION OF THE DRAWINGS

FIG. 4 is a first cross-sectional view of the example sensing instrument of FIG. 2, taken along the 2-2 line of FIG. 2, and coupled to a pipe.

FIG. 5 is a second cross-sectional view of the example sensing instrument of FIG. 2, taken along the 2-2 line of FIG. 2, and coupled to the pipe of FIG. 4.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Pressure and temperature properties of a fluid flowing through one or more pipes of a fluidic system may be monitored during system operations to monitor a flow rate of the fluid. In fluidic systems such as automated sealing applications for aircraft construction and maintenance, a substantially constant volumetric flow rate is important during dispensing of a sealant (e.g., by a robot) to meet specifications for sealant bead geometry and an amount of sealant to be dispensed. Temperature and pressure of a fluid such as the sealant affect properties such as a density and viscosity of the fluid, which affect the volumetric flow rate. Therefore, fluid pressure and temperature are variables that contribute to maintaining a constant volumetric flow rate. However, fluid pressure and temperature properties may be difficult to measure due to limited space and weight constraints within a piping system.

One or more sensors may be used to monitor pressure and temperature of a fluid flowing through a pipe. A flow-through sensor provides for measurements as fluid flows past or through the sensor. However, some known flow-through sensors only measure pressure and, thus, do not measure temperature. Also, although piezoelectric flow-through sensors measure relative changes in fluid pressure, they are not suitable for absolute pressure measurements.

Figure 1:
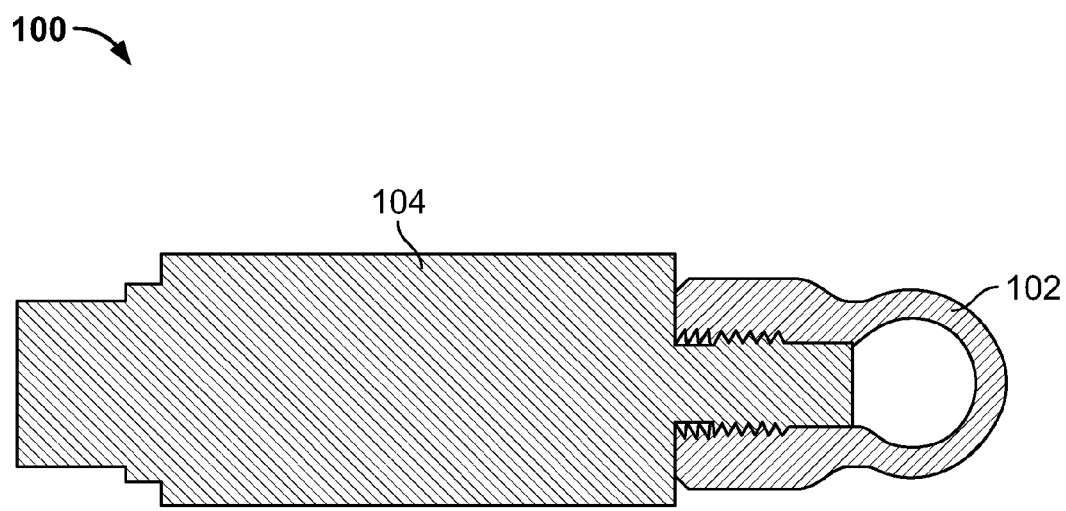
FIG. 1 is a cross-sectional view of a known flow-through sensor.

Known sensors that measure fluid pressure and temperature are limited in that they often only measure fluid along a single axis or one side of the pipe and/or disrupt a cross-sectional geometry of the pipe and, thus, obstruct, inhibit, or interfere with a flow of the fluid through the pipe. For example, FIG. 1 is a cross-sectional view of an example prior art flow-through sensor 100 coupled to a pipe 102. As illustrated in FIG. 1, the prior art flow-through sensor 100 is embedded in a wall of the pipe 102. As a result, the known sensor 100 includes an appendage 104 that extends from the pipe 102. The appendage 104 may interfere or collide with, for example, other pipes of a fluid system installed within a confined space. Further, as illustrated in FIG. 1, the known sensor 100 disrupts the circular cross-sectional geometry of the pipe 102 and, thus, interferes with fluid flow through the pipe 102. Further, the known sensor 100 only measure properties of a fluid along one side or longitudinal flow path of the pipe 102 (e.g., where the pipe 102 includes a plurality of longitudinal flow paths extending along a length of the pipe 102). Therefore, data collected by the known sensor 100 does not include the pressure or temperature properties of the fluid flowing through the pipe 102 along a longitudinal flow path or side opposite the wall where the sensor 100 is embedded. Also, some known sensors have a limited life cycle due to fluid build-up at the sensor, which can interfere with sensor readings.

Example apparatus and methods disclosed herein provide for fluid temperature and pressure measurements via sensors that are integrated within a piping system (e.g., configured to be coupled to a pipe of the piping system). In the examples disclosed herein, a flow-through pressure and temperature sensor is disposed within a housing. The housing is coupled between two ends of a pipe (e.g., between ends of a portion of the pipe that has been cut for insertion of the housing or between a first end of a first pipe and second end of a second pipe in the piping system) such that a fluid flow path through the housing is substantially aligned (e.g., coaxial) with a flow path of the pipe. As a result of the coupling, the housing is integrated with the pipe and fluid flows through the pipe and the housing.

An example sensor disposed in the housing extends axially along the housing, as a ring around a flow path of the fluid, or some combination thereof. The sensor includes a deformable material (e.g., a conductive wire including a shape memory alloy or electroactive polymer). Fluid flowing through the housing passes by the sensor. Fluid forces exerted on the sensor cause physical deformation of the sensor. The physical deformation of the sensor is used to measure pressure and/or temperature of the fluid. In particular, pressure of the fluid flowing through the housing imparts forces on the sensor and causes the sensor to deform. Changes in the shape of the sensor as a result of the deformation change electrical properties of the sensor, such as a resistance or conductance of the sensor. As a result of the changes of the electrical properties of the sensor, voltage across or current flowing through the deformed sensor differ as compared to the non-deformed sensor. Changes in voltage or current are measured across the sensor via a circuit coupled to the sensor and are sent as signal data (e.g., via cable operatively coupled to the sensor or wirelessly) to a controller within the piping system, which uses the signal data to determine fluid pressure and/or temperature.

Thus, the example flow-through sensors disclosed herein can be used with piping systems in constrained spaces. Rather than including appendages that extend from the pipe and that may interfere or collide with other components of the system, an example sensing instrument disclosed herein is integrated with the pipe such that a fluid flow path through the sensing instrument is substantially aligned (e.g., coaxial) with a fluid flow path through the pipe. Further, the example sensing instrument has a cross-section that substantially matches a cross-sectional shape (e.g., cylindrical, rectangular) and, in some examples, a size, of the pipe. Such a configuration minimizes or substantially eliminates changes to the cross-sectional area and shape of the pipe and, thus, substantially reduces or eliminates disruptions to the flow path of the fluid through the pipe, for example, as compared to the known sensor 100 of FIG. 1. Further, the disclosed examples collect signal data at multiple positions (e.g., circumferential positions, longitudinal positions) on the pipe, and the signal data at each position can be collectively analyzed (e.g., averaged), thereby increasing the accuracy of the resulting pressure and/or temperature measurements determined from the signal data.

The example sensors disclosed herein can measure pressure of a fluid within the housing, fluid temperature, or both pressure and temperature. Further, based on geometric and/or material properties of the sensor, such as thickness and stiffness, the sensor readings can be used to determine other measurements such as resistance of the sensor in the deformed state and/or forces acting on the sensor. In some examples, changes in capacitance of the sensor are measured and used to determine pressure.

The housing may be fastened or threaded to the pipe to provide for a stable mounting of the housing to the pipe as the fluid flows through the pipe and the housing. Further, the examples disclosed herein can be readily cleaned and/or flushed to prevent fluid build-up. Also, in some examples, the housing includes a transparent material that allows a system operator to observe the deformation (e.g., expansion) of the sensor to visually monitor pressure.

Figure 2:
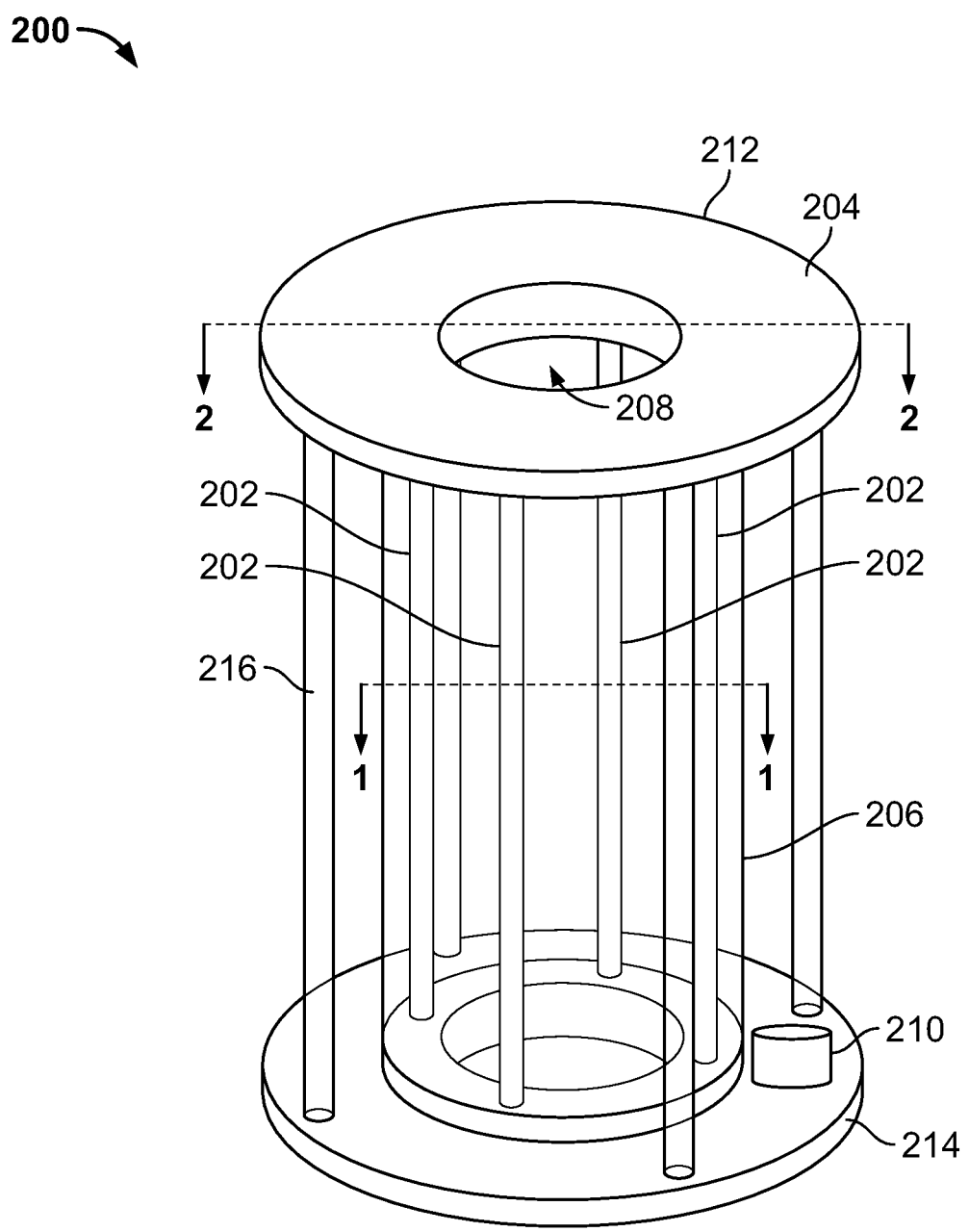
FIG. 2 is a perspective view of an example flow-through sensing instrument in accordance with the teachings disclosed herein.

FIG. 2 is an example sensing instrument 200 including one or more sensors 202 having a deformable material and disposed in a housing 204. In the example of FIG. 2, the sensors 202 are disposed in a sensor carrier 206, or a medium to which the sensors 202 are coupled. As shown in FIG. 2, the housing 204 and the sensor carrier 206 include an aperture 208 formed therein. When the housing 204 is coupled to a pipe, fluid flowing through the pipe flows through sensing instrument 200 via the aperture 208 such that the fluid flows past the sensors 202 disposed in the sensor carrier 206. Put another away, the aperture 208 is aligned with an opening or a fluid flow path of the pipe. In some examples, a diameter of the aperture 208 is substantially the same as an inner diameter of the pipe to which the housing 204 is coupled. In the example sensing instrument 200 of FIG. 2, the sensors 202 and the sensor carrier 206 deform as a result of pressure from the fluid flow through the aperture 208. Thus, the aperture 208 provides a fluid flow path for a fluid flowing through a pipe and into the sensing instrument 200 coupled to the pipe.

A circuit 210 is coupled to the housing 204 and operatively (e.g., electrically) coupled to the sensors 202. The circuit 210 measures changes in electrical properties of the sensors 202 as a result of the deformation of the sensor 202 and/or the sensor carrier 206. In particular, the circuit 210 measures a current through or a voltage drop across each of the sensors 202. The measured voltage drop and/or current values are converted to digital data, which is used to determine pressure and/or temperature of the fluid, as will be disclosed below. In some examples, the circuit 210 includes two or more circuits and/or a circuit board. Also, in some examples, the circuit 210 detects a flow of fluid past the sensors 202 and/or a deformation of the sensor carrier 206 and/or the sensors 202 (e.g., an expansion and/or contraction of the sensor carrier 206 and/or the sensors 202).

The housing 204 of the example sensing instrument 200 of FIG. 2 is made of metal and serves as a rigid support for the sensing instrument 200 when the sensing instrument 200 is removably coupled to a pipe of a piping system. The housing 204 can be made of other materials having stiffness and/or rigidity to support the sensing instrument 200 when the sensing instrument 200 is coupled to a pipe. In some examples, a portion of a pipe is removed (e.g., cut) at a location where fluid pressure and/or temperature is to be measured and the sensing instrument 200 is coupled between ends of the pipe created from the removal of the portion of the pipe. In other examples, the sensing instrument is coupled between respective ends of a first pipe and a second pipe. To couple the sensing instrument 200 to the ends of the pipe(s), the housing 204 is clamped, bolted, or otherwise fastened to the pipe ends at a first flange or plate 212 of the housing 204 (e.g., corresponding to a first end of the housing 204) and a second flange or plate 214 of the housing 204 (e.g., corresponding to the second end of the housing 204) to secure the sensing instrument 200 to the pipe ends.

The example housing 204 of FIG. 2 includes supporting rods 216 coupled between the first flange 212 and the second flange 214. As a result, the housing 204 includes open or transparent portions that enable an operator to view the sensor carrier 206 and/or the sensors 202. The open or cage-like design of the example housing 204 of FIG. 2 allows the operator to view the expansion of the sensor carrier 206 as a result of pressure from the fluid flow through the aperture 208 and provides a visual means for the operator to estimate pressure. In some examples, markings may be provided on the housing 204 to provide an indication of an amount of expansion of the sensor carrier 206 relative to a non-deformed state of the sensor carrier 206 for reference by an operator. In other examples, the housing 204 includes a wall disposed about the sensor carrier 206 and/or the sensors 202 such that the sensor carrier 206 and/or the sensors 202 are not visible through the housing 204. In such examples, the wall protects the sensor carrier 206 and/or the sensors 202 from collisions with, for example, debris or other moving parts near the piping system in which the sensing instrument is installed and that may come into contact with the sensing instrument 200, such as in a factory setting. The wall can also shield the sensor carrier 206 and/or the sensors 202 from ambient pressure and temperature fluctuations, for example, when the piping system in which the sensing instrument is installed is located in a windy environment.

Also, although the example housing 204 of FIG. 2 is shown as having a substantially cylindrical shape, the housing 204 can be other shapes (e.g., rectangular) based on, for example, a shape of the pipe(s) to which the housing 204 is to be coupled and/or space constraints within a piping system. The length and/or width of the housing 204 can also be based on, for example, a location where the sensing instrument 200 is to be coupled within the piping system (e.g., a distance between pipe ends).

Figure 3:
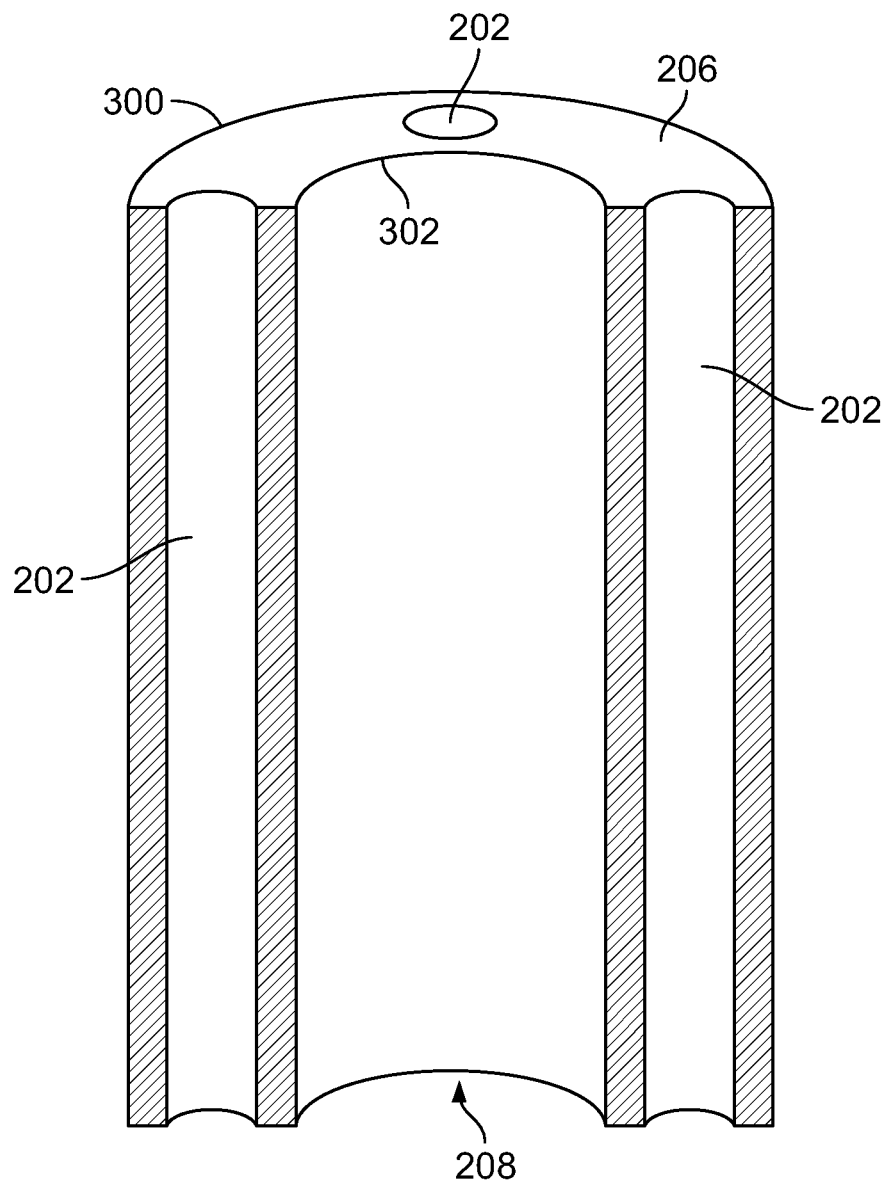
FIG. 3 is a perspective, partial cut-away view of the example sensing instrument of FIG. 2, taken along the 1-1 line of FIG. 2.

FIG. 3 is a perspective, partial cut-away view of the example sensing instrument 200 of FIG. 2, taken along the 1-1 line of FIG. 2 and showing the sensors 202 disposed in the sensor carrier 206. The one or more sensors 202 of the sensing instrument 200 include an electrically conductive, elastic material such as a shape-memory alloy or superelastic material (e.g., nickel titanium), an electroactive polymer, a stretchable conductive wire, and/or any other material that allows for a flow of current through the material and that has electrical properties that change with a change in shape of the material. The sensor carrier 206 is an electrically and thermally non-conductive, elastic material in that the sensor carrier 206 electrically insulates the sensors 202 from one another. The electrical non-conductivity of the sensor carrier 206 prevents interference between the sensor carrier 206 and the electrical signals passing through the sensor carrier 206 from the sensors 202 and provides for electrical isolation of the sensors 202 from one another. The thermal non-conductivity of the sensor carrier 206 prevents temperature influence from the ambient environment with respect to the sensors 202. For example, the sensor carrier 206 can include rubber, plastics, silicones, PVC, or latex.

The example sensor 202 illustrated in FIGS. 2 and 3 is an electrically conductive, elastic wire extending along the length of the sensor carrier 206. As also shown in FIGS. 2 and 3, a plurality of sensing wires or sensors 202 can be spaced apart within the sensor carrier 206 to measure pressure and/or temperature about the fluid flow path through the sensing instrument 200 and, thus, a pipe to which the sensing instrument 200 is coupled. For example, the sensors 202 can be spaced apart about a central axis of the housing 204. Therefore, during operation of the sensing instrument 200, data is not collected along only one longitudinal flow path or one side of the sensing instrument 200 and pipe, but instead is collected at multiple positions (e.g., circumferential positions, longitudinal positions) about the fluid flow path. The sensors 202 can be spaced evenly or symmetrically in the sensor carrier 206. In other examples, the placement of the sensors 202 in the sensor carrier 206 is not based on a pattern. Also, although four sensors 202 are shown disposed in the sensor carrier 206 of the sensing instrument 200 of FIG. 2, the sensing instrument 200 can include additional or fewer sensors 202 based on, for example, a sensitivity of the pressure and/or temperature readings to be obtained from the sensing instrument 200. In some examples, the sensing instrument 200 includes at least two sensors 202 to reduce bias from collecting readings along only one longitudinal axis when the sensor 202 is a longitudinal wire.

The one or more sensors 202 can be arranged in configurations other than those illustrated in FIGS. 2 and 3. For example, the sensing instrument 200 can include one or more sensor rings disposed in the sensor carrier 206 and extending around a circumference of the sensor carrier 206 (e.g., electrically conductive wires formed as rings). The sensor rings can be coupled by one more sensing wires extending longitudinally along the sensor carrier 206. In other examples, a single sensor ring is disposed in or coupled to the sensor carrier 206 at a position midway along a length of the sensor carrier 206.

As another example, the sensors 202 can also be arranged in a spiral or helix configuration such that a sensing wire disposed in the sensor carrier 206 includes partially curved portions extending longitudinally along the sensor carrier 206. The sensors 202 can be arranged in other configurations (e.g., a crisscross design) based on, for example, the number of sensors 202, the size of the housing 204, properties of the sensor carrier 206 such as shape and thickness, and/or the type of fluid flowing through the housing 204. A configuration and/or a number of the sensors 202 of the sensing instrument 200 can also be based on an amount and/or sensitivity of the voltage or current data to be collected by the sensing instrument 200 and/or the pressure or temperature data to be obtained from the collected data.

In the examples of FIGS. 2 and 3, the sensors 202 are disposed or embedded in the sensor carrier 206. In some examples, the sensors 202 are coupled to an interior surface of the sensor carrier 206 (e.g., a surface of the sensor carrier that is exposed to the fluid passing through the sensing instrument 200). In such examples, the sensors 202 are in contact with the fluid as the fluid passes through the sensing instrument 200. The sensors 202 can be placed on the interior surface of the sensor carrier 206 in examples for accuracy with respect to the temperature readings of the fluid. In other examples, the one or more sensors 202 are coupled to an exterior surface of the sensor carrier 206 (e.g., a surface of the sensor carrier 206 that is exposed to the supporting rods 216 of the housing 204). In such examples, processing of the data output by the sensing instrument 200 may include filtering noise introduced by the ambient environment. The configuration of the sensors 202 with respect to placement in or about the sensor carrier 206 can be selected to optimize accuracy of the resulting pressure and/or temperature readings while reducing a number of sensors 202 used in the sensing instrument 200.

The sensor carrier 206 includes an outer edge 300 and an inner edge 302, as shown in FIG. 3. When the housing 204 is coupled to a pipe, the inner edge 302 of the sensor carrier 206 aligns with an inner edge of the pipe. Put another way, an inner diameter of the sensor carrier 206 formed by the edge 302 aligns with an inner diameter of the pipe to which the housing 204 is coupled. Thus, the sensor carrier 206 substantially serves as a continuation wall of the pipe when the sensing instrument 200 is coupled to the pipe.

FIG. 4 illustrates a coupling of the sensing instrument 200 to a pipe 400. The housing 204 is coupled (e.g., fastened) to a first end 402 of the pipe 400 at the first flange 212 of the housing 204 and a second end 404 of the pipe 400 at the second flange 214 of the housing 204. For example, the first and second flanges 212, 214 may be bolted or threaded to the pipe 400 at the respective first and second ends 402, 404.

As shown in FIG. 4, the inner edge 302 of the sensor carrier 206 substantially aligns with (e.g., is coaxial with) an inner edge 406 of the pipe 400. This coaxial alignment between the sensing instrument 200 and the pipe 400 provides for a substantially seamless or uninterrupted fluid flow path 408 (as represented by the vertical dashed line in FIG. 4) for a fluid 410 flowing through the pipe 400 and the sensing instrument 200. Further, the alignment of the inner edge 302 of the sensor carrier 206 with the inner edge 406 of the pipe 400 serves to not disrupt the cross-section of the pipe 400. The shape of the sensor carrier 206 can be selected to substantially match a cross-section of the pipe 400. Although the sensor carrier 206 of FIGS. 2-4 is shown as having a circular cross-section, other shapes (e.g., rectangular) may be selected based on the shape of the pipe 400.

Thus, as illustrated in FIG. 4, the sensing instrument 200 is integrated with the pipe 400 via the coupling of the housing 204 to the pipe 400 and the alignment of the inner edge 302 of the sensor carrier 206 with the inner edge 406 of the pipe 400. This coaxial alignment of the sensing instrument 200 and the pipe 400 facilitates cleaning of the pipe 400 and the sensing instrument 200 via flushing. Further, the integration of the sensing instrument 200 with the pipe 400 eliminates external appendages of the sensing instrument 200 that may interfere with other components of the piping system, such as the appendage 104 of the prior art sensor 100 of FIG. 1. Unlike the prior art sensor 100 of FIG. 1, which is coupled to the pipe 102 of FIG. 1 at an angle substantially perpendicular to the flow path of the pipe 102 and has a large footprint as a result of the appendage 104, the sensing instrument 200 has a low profile that follows a length of the pipe 400. Also, although one sensing instrument 200 is shown coupled to the pipe 400 in FIG. 4, two or more sensing instruments can be coupled to the pipe 400 along a length of the pipe 400 or throughout a piping system.

As fluid 410 flows along the flow path 408 through the pipe 400 and into the sensing instrument 200 via the aperture 208, the fluid 410 passes by the sensors 202 disposed in the sensor carrier 206. Pressure within the aperture 208 from the fluid 410 creates forces that act upon the sensor carrier 206 and cause the sensor carrier 206 to deform or change shape. As a result of the deformation of the sensor carrier 206, the sensors 202 disposed therein also deform.

FIG. 5 illustrates the deformation of the sensor carrier 206 and the sensors 202 as a result of the pressure of the fluid 410 flowing through the sensing instrument 200, or a change in a shape of the sensor carrier 206 and the sensors 202 from a respective first shape or non-deformed shape as illustrated in FIG. 4 to a respective second shape or deformed shape as illustrated in FIG. 5. For example, as shown in FIG. 5, the sensor carrier 206 and the sensors 202 have deformed outwardly or expanded relative to a longitudinal axis extending through a center of the aperture 208. As a result of the expansion of the sensor carrier 206 and the sensors 202, a distance between a supporting rod 216 and the deformed sensor carrier 206 is less than a distance between the supporting rod 216 and the non-deformed sensor carrier 206 in the example of FIG. 4 at one or more points along a length of the sensing instrument 200.

The elastic properties of the sensor carrier 206 allows for the deformation of the sensor carrier 206. The elastic material selected for the sensor carrier 206 can be based on, for example, a pressure or a range of pressures to which the sensor carrier 206 will be subjected as a result of the fluid flow. Material properties such as a stiffness of the material, as indicated by Young's modulus, and a thickness of the material of the sensor carrier 206 can be selected to control deformation of the sensor carrier 206 to allow for expansion of the sensor carrier 206 and sufficient sensitivity but not so much expansion that the sensor carrier 206 fails (e.g., rips) as a result of the pressure. For example, a material having a high Young's modulus (e.g., a stiff material) may be used for examples where the fluid 410 is flowing through the pipe 400 has a high pressure. In examples where a pressure of the fluid 410 is low, a material having a low Young's modulus, such as latex, may be used for the sensor carrier 206.

To select a material for the sensor carrier 206, the expansion of a material at different fluid pressures can be calculated to determine, for example, whether a thickness of a material should be increased to prevent plastic deformation or failure of the material and/or whether a different type of material should be selected (e.g., a stiffer material). For example, the sensor carrier 206 can be modeled as a cylindrical pressure vessel including open ends having an inner radius $r_i$, an outer radius $r_o$, Young's modulus E, and Poisson's ratio v. Pressure inside the sensor carrier 206 can be represented as $p_i$ and external pressure $p_o$ can be given a value of approximately 14.7 psi, or atmospheric pressure. Stresses and strains on the sensor carrier 206 for a given internal pressure $p_i$ can be determined using the following equations:

$$\text{Hoop stress, } \sigma_{\theta\theta}(r) = \frac{r_i^2 p_i - r_o^2 p_o}{r_o^2 - r_i^2} + \frac{(p_i - p_o)}{r^2} \frac{r_i^2 r_o^2}{r_o^2 - r_i^2}; \quad \text{(Eq. 1)}$$

$$\text{Radial stress, } \sigma_{rr}(r) = \frac{r_i^2 p_i - r_o^2 p_o}{r_o^2 - r_i^2} - \frac{(p_i - p_o)}{r^2} \frac{r_i^2 r_o^2}{r_o^2 - r_i^2}; \quad \text{(Eq. 2)}$$

$$\text{Longitudinal stress, } \sigma_{zz} = 2v\left(\frac{r_i^2 p_i - r_o^2 p_o}{r_o^2 - r_i^2}\right); \quad \text{(Eq. 3)}$$

Hoop strain, (Eq. 4)

$$\varepsilon_{\theta\theta}(r) = \frac{1+v}{E}\left[(1-2v)\frac{r_i^2 p_i - r_o^2 p_o}{r_o^2 - r_i^2} + \frac{(p_i - p_o)}{r^2} \frac{r_i^2 r_o^2}{r_o^2 - r_i^2}\right];$$

Radial strain, (Eq. 5)

$$\varepsilon_{rr}(r) = \frac{1+v}{E}\left[(1-2v)\frac{r_i^2 p_i - r_o^2 p_o}{r_o^2 - r_i^2} - \frac{(p_i - p_o)}{r^2} \frac{r_i^2 r_o^2}{r_o^2 - r_i^2}\right];$$

$$\text{Longitudinal strain, } \varepsilon_{zz} = 0; \quad \text{(Eq. 6)}$$

Radial expansion, (Eq. 7)

$$\delta_r(r) = \frac{1+v}{E}\left[(1-2v)\frac{r_i^2 p_i - r_o^2 p_o}{r_o^2 - r_i^2}r + \frac{(p_i - p_o)}{r} \frac{r_i^2 r_o^2}{r_o^2 - r_i^2}\right].$$

From the above example equations, the expansion of the outer radius of the sensor carrier 206 can be determined as follows, where $\delta_r$ is the radial expansion of the sensor carrier 206 at the outer radius $r_o$:

$$\delta_r(r=r_o) = \frac{1+v}{E}\left[(1-2v)\frac{r_i^2 p_i - r_o^2 p_o}{r_o^2 - r_i^2}r_o + (p_i - p_o)\frac{r_i^2 r_o}{r_o^2 - r_i^2}\right]. \quad \text{(Eq. 8)}$$

It is noted that example Equation 8 assumes that the whole sensor carrier 206 expands or deforms under the internal pressure $p_i$, whereas in operation, the ends of the sensor carrier 206 are constrained to align the ends of the sensor carrier 206 with the ends 402, 404 of the pipe 400 (e.g., the ends of the sensor carrier 206 are fixed to the flanges 212, 214 of the housing 204).

Thus, expansion of the sensor carrier 206 can be estimated for a given internal pressure $p_i$ and a selected material having certain dimensions (e.g., inner and outer radii $r_i$, $r_o$) and properties (e.g., Young's modulus E, Poisson's ratio v). The radial expansion determined using Equation 8 at the internal pressure $p_i$ can be used determine the outer radius $r_o$ of the sensor carrier 206 in the expanded position. The outer radius $r_o$ of the sensor carrier 206 in the expanded position is used in computing the stresses of the sensor carrier 206 in the expanded positions (e.g., via the example Equations 1-6 above). The resulting stresses can be compared to the ultimate tensile strength of the selected material to determine if the material would plastically deform or fail at or before reaching the expanded position.

If the material would deform plastically or fail at the estimated radial expansion, then a different material can be selected that can withstand the internal pressure $p_i$ or a range of internal pressures (e.g., pressure values a certain amount above or below the internal pressure $p_i$) to which the sensor carrier 206 is to be subjected, such as a stiffer material. Alternatively, a thickness of the selected material can be increased so that the material expands less and is able to withstand the internal pressure $p_i$ or the associated range of pressures. For example, using Equation 8 above, a rubber material having a thickness of 1/32 inches (approximately 0.79 mm) is estimated to expand approximately 1 and 1/8 inch (approximately 28.2 mm) in diameter at an internal pressure $p_i$ of 1000 psi. Based on the calculated stresses at the expanded diameter, the rubber material will fail before reaching the expanded position. If, however, the thickness of the rubber material is increased to 1/8 inch (approximately 3 mm), the diameter of the rubber material is estimated to expand by 5/16 inches (approximately 8 mm). At this amount of radial expansion, the stresses on the material remain below the ultimate tensile strength or failure point for the rubber material. Thus, the rubber material with the greater thickness may be selected for applications involving internal pressures at or around 1000 psi.

The above equations can be used to evaluate changes in dimensions of a material and/or a material type and to select a material for the sensor carrier 206. In such a manner, a material and/or dimensions of a material may be selected for an internal pressure or range of pressures to which the sensor carrier 206 is expected to be subjected when the sensing instrument 200 is coupled to the pipe 400. Other factors, such as a diameter of the pipe 400 with which the sensor carrier 206 is to be aligned may be considered in selecting the type of material and/or the dimensions of the material. Also, in some examples, the material of the sensor carrier 206 is selected to elastically deform over a range of pressures to enable the sensing instrument 200 to be removably coupled to pipes subject to different fluid pressures. Thus, the sensor carrier 206 can be customized for a piping system or systems into which the sensing instrument 200 is to be installed.

In the example of FIG. 5, each of the sensors 202 deforms (e.g., elongate) at least as much as the sensor carrier 206 so as not to inhibit the expansion of the sensor carrier 206. Thus, a material of a respective sensor 202 is selected based on material properties (e.g., stiffness, thickness) that allow the sensor to deform at least as much as the sensor carrier 206 without an internal stress resulting from the deformation of the sensor 202 reaching a yield strength of the sensor material (e.g., a point at which the sensor 202 plastically deforms and will not return to its original shape). In some examples, the material of the sensor 202 has a Young's modulus that is less than a Young's modulus of the material of the sensor carrier 206 (i.e., the material of the sensor 202 is less stiff or more flexible than the sensor carrier 206). As noted above with respect to selecting materials for the sensor carrier 206, properties such as a diameter of the pipe 400 and a range of pressures over which the sensing instrument 200 is to be exposed affect the selection of the material for the sensors 202.

To select the material for the sensor 202, the sensor 202 can be modeled as a beam with fixed ends. In examples where the sensor 202 is considered to be a wire w extending longitudinally along the sensor carrier 206, the following variables can be associated with the sensor 202: Young's modulus $E_w$; internal pressure $p_i$; length L; radius $r_w$ (e.g., half of the wire diameter or gauge); a pressure force on the wire F, where $F=2p_i r_w L$; and a moment of intertia of the sensor 202 I, where $I=\pi r_w^4/4$. Based on the above variables, the deformation of the wire can be expressed by the following example equation:

$$\delta_w(x) = \frac{Fx^2}{24EIL}(L-x^2), \quad \text{(Eq. 9)}$$

where x is a position along the wire. The maximum deformation of the sensor 202, which can be found at a center of the wire (i.e., x=L/2), can be found using the following example equation:

$$\delta_{w,max} = \frac{FL^3}{384EI}. \quad \text{(Eq. 10)}$$

Based on Equation 9 for determining the deformation of the sensor 202, a new length of the sensor 202 as a result of the deformation can be found as follows:

$$L_{new} = \frac{1}{12EIL}\int_0^L \sqrt{(12EIL)^2 + (Fx(L-x)(L-2x))^2}\, dx. \quad \text{(Eq. 11)}$$

Example Equation 11 can be solved using a Taylor expansion to approximate an amount of elongation of the sensor 202. The maximum deformation $\delta_{w,max}$ of the sensor 202 found using Equation 11 is compared to the deformation $\delta_r$ of the sensor carrier 206 found using Equation 8, above. The maximum deformation $\delta_{w,max}$ of the sensor 202 should be at least as much as the deformation $\delta_r$ of the sensor carrier 206 so the sensor 202 does not inhibit the expansion of the sensor carrier 206. The maximum deformation $\delta_{w,max}$ and/or the extended length $L_{new}$ can be used to determine whether the sensor 202 will deform plastically. A material for the sensor 202 and/or dimensions of the material (e.g., radius $r_w$) for the sensor 202 can be selected based on the deformation analysis for different internal pressures $p_i$ and in view of the material selected for the sensor carrier 206.

Although the above-disclosed example analysis considered the sensor 202 as a wire, a substantially similar analysis can be performed for sensors having other shapes. For example, a sensor shaped as a ring disposed in the sensor carrier 206 would elongate based on a new radius of the sensor carrier 206 as a result of deformation of the sensor carrier 206. A new circumference of the sensor ring could be found to identify the deformation properties of the sensor ring made of a particular material. Also, the equations disclosed herein are examples and can include variations thereof. Thus, the scope of coverage of this patent is not limited to the example equations disclosed herein.

Changes in the length and cross-sectional area of the sensor 202 as a result of deformation change the electrical properties of the sensor 202. For example, for a sensor 202 in the form of a wire having a resistivity $\rho$, a length L, and cross-sectional area A, changes in the length L and the cross-sectional area A change the resistance R (where $R=(\rho L)/A$) and the conductance G (where $G=1/R$) of the sensor 202. The changes in resistance affect the voltage V or current/measured across the sensor 202 (e.g., where $V=IR$ and $1=V/R$). Fluid temperature can also affect the resistance R of the sensor 202. Resistivity $\rho$ depends on temperature. Thus, changes in fluid temperature change the resistance R of the sensor 202, which affects the measurable voltage and current, as indicated by the above equations. In some examples, the changes in the voltage or current measurements due to fluid pressure effects are decoupled or distinguished from changes in the voltage or current measurements due to fluid temperature effects during, for example, processing of the signal data collected via the sensor(s) 202.

The relationship between changes in material characteristics of the sensor 202 due to deformation from pressure forces and the resulting changes in the electrical properties of the sensor 202 can be used when the sensing instrument 200 is in operation to determine the fluid pressure and/or temperature. For example, Equation 11 for the elongation or deformation of the sensor 202 due to an internal pressure $p_i$ can be found using the following expression:

$$L_{new}(p_i, r_w) = \frac{1}{12EIL_o} \int_0^{L_o} \sqrt{(12EIL_o)^2 + (Fx(L_o - x)(L_o - 2x))^2} \, dx. \quad \text{(Eq. 12)}$$

As noted above, a resistance of the sensor 202 can be expressed as:

$$R = \frac{\rho L}{A}. \quad \text{(Eq. 13)}$$

Based on Equations 12 and 13, a current across the sensor 202 can be expressed as:

$$I = \frac{V}{R} = \frac{VA}{\rho L} = \frac{VA(12EIL)}{\rho \int_0^L \sqrt{(12EIL)^2 + (Fx(L-x)(L-2x))^2} \, dx}, \quad \text{(Eq. 14)}$$

where force F is proportional to pressure $p_i$ (e.g., $F=2p_i r_w L$). As disclosed above, the circuit 210 measures a current flowing through (or a voltage across) the sensor 202. Based on the relationship between force F and pressure $p_i$, Equation 14 can be solved for pressure $p_i$ to determine a fluid pressure based on a current I measured by the circuit 210 when the sensing element 200 is coupled to the pipe 400 and the elongation and material properties of the sensor 202. In examples where the circuit 210 measures voltage, the above equations can be manipulated to solve for pressure based on a measured voltage. In other examples, the current or voltage measurements are used to solve for temperature of the fluid.

In examples where the sensing instrument 200 includes two or more sensors 202, the circuit 210 collects current or voltage measurements from each of the sensors 202. The above-disclosed analysis for determining pressure or temperature based on the current or voltage measurements and the sensor deformation variables can be performed for each sensor 202. In some examples, the results of the respective pressure and/or temperature measurements determined from the current or voltage data collected from each sensor 202 are averaged to provide a single value fluid pressure or temperature output. In other examples, multiple fluid pressure or temperature values are provided based on data collected from the respective sensors 202. Thus, in the disclosed examples, the deformation of the sensors 202 and the resulting current or voltage measurements are used to determine pressure and/or temperature of the fluid 410 flowing through the sensing instrument 200 and, thus, the pipe 400.

Figure 6:
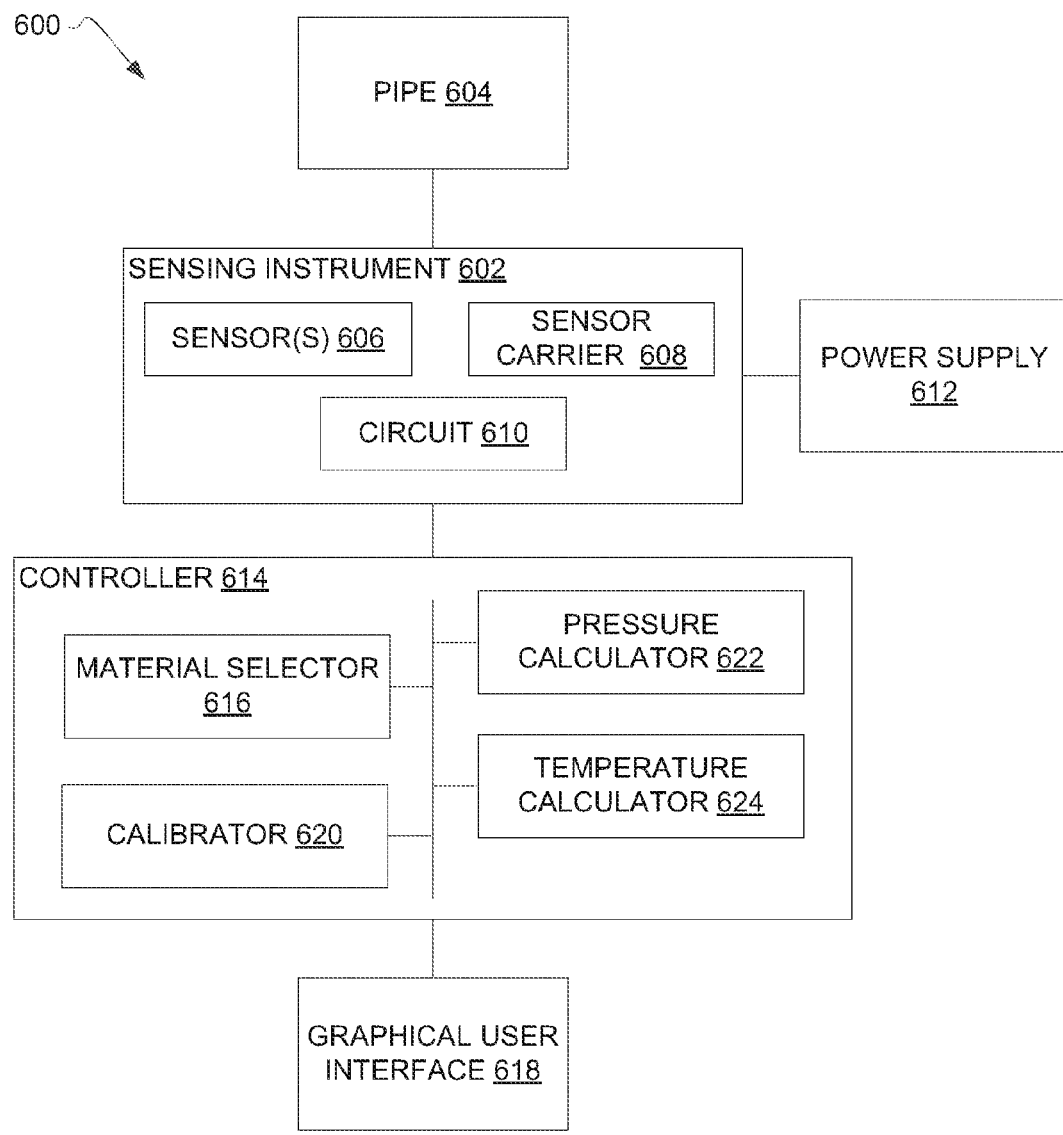
FIG. 6 is a block diagram of an example control system for determining pressure or temperature of a fluid using the example sensing instrument of FIG. 2.

FIG. 6 is a block diagram of an example control system 600 for measuring a pressure and/or temperature of a fluid flowing through a pipe to which a sensing instrument, such as the sensing instrument 200 of FIGS. 2-5, is coupled based on changes in electrical properties of one or more sensors of the sensing instrument resulting from material deformation of the sensors. In the example system 600 of FIG. 6, a sensing instrument 602 is coupled to a pipe 604 (e.g., the pipe 400 of FIGS. 4 and 5). The sensing instrument 602 includes one or more sensors 606 (e.g., the sensor(s) 202 of FIGS. 2-5) and a sensor carrier 608 (e.g., the sensor carrier 206 of FIGS. 2-5). The sensing instrument 602 also includes a circuit 610 (e.g., the circuit 210 of FIGS. 2,4, 5). A power supply 612, such as a battery, is electrically coupled to the sensing instrument 602. The power supply 612 provides a current through the sensors 606, for example, by creating a voltage difference across each of the sensors 606. The circuit 610 monitors the current drawn through the sensors 606 or the voltage drop across the respective sensors 606. In some examples, the circuit 610 includes two or more circuits and/or a circuit board. Also, in some examples, the circuit 610 detects a flow of fluid past the sensors 606 and/or a deformation of the sensor carrier 608 and/or the sensors 606.

In some examples, the sensors 606 are disposed in the sensor carrier 608. In other examples, the sensors 606 are coupled to an interior or an exterior surface of the sensor carrier 608. The one or more sensors 606 and the sensor carrier 608 are made of a deformable material. In the example system 600, the sensing instrument 602 is coaxially aligned with the pipe 604 when the sensing instrument 602 is coupled to the pipe 604. As a fluid from the pipe 604 flows through the sensing instrument 602, the sensors and the sensor carrier 608 deform due to pressure forces on the sensor carrier 608. The circuit 610 monitors the changes in the voltage or current through the sensors 606 due to the deformation of the sensors 606, which affects electrical properties of the sensors 606 such as resistance and conductance. In some examples, the circuit 610 monitors changes in a capacitance of the sensors 606. For example, a voltage at a first end of one of the sensors 606 can be increased and a response time, or an amount of time for the voltage to change at a second end of the sensor 606 can be recorded. Changes in the response time as a result of deformation of the sensor 606, which changes the length and/or the shape of the sensor 606, can be detected by the circuit 610.

In some examples, the circuit 610 also filters noise from the recorded data. For example, the sensing instrument 602 may vibrate at different frequencies as a result of the pressure of the fluid flowing through the sensing instrument 602 and the elastic deformation (e.g., expansion and contraction) of the sensors 606. The circuit 610 can filter out such noise from the collected data. The voltage or current data collected by the circuit 610 is transmitted to a controller 614 of the example system 600, which determines the fluid pressure and/or temperature measurements.

The controller 614 includes a material selector or database 616. The material selector 616 evaluates the material deformation behavior of the sensors 606 and the sensor carrier 608. In some examples, the material selector 616 implements one or more of Equations 1-8 to determine an amount of expansion of the sensor carrier 608 at different pressures and one or more of Equations 9-11 to determine an amount of expansion of the sensors 606 at the different pressures. The results of one or more of the Equations 1-11 are used by the material selector 616 to identify respective materials, material properties, and/or dimensions of the respective materials for the sensors 606 and the sensor carrier 608. In some examples, the material expansion data, the identified materials, and/or the material dimensions are displayed via a graphical user interface (GUI) 618 operatively coupled to the controller 614 to allow an operator to select a material and/or dimensions of the material. After the respective materials have been selected for the sensors 606 and the sensor carrier 608 (e.g., automatically selected by the material selector 616 or selected by an operator via the GUI 618), the material selector or database 616 stores data about the material properties of the selected materials, such as the Young's modulus for the materials and the material deformation behavior at different pressures.

The controller 614 also includes a calibrator 620. The calibrator 620 calibrates the sensing instrument 602 after fabrication of the sensing instrument 602 including the sensors 606 and the sensor carrier 608 having respective materials based on the material evaluation performed by the material selector 616. In performing the calibration, the calibrator 620 considers the readings collected by the circuit 610 (e.g., current or voltage readings) during deformation of the sensors 606 at known internal pressures of a fluid flowing through the sensing instrument 602. The calibrator 620 uses the current, voltage, or deformation data collected from the sensors 202 at known internal pressures to adjust or calibrate one or more of the equations used to find fluid pressure and temperature.

For example, the calibrator 620 can calibrate example Equation 14 above, which expresses the relationship between current and elongation of the sensors 606 and can be used during operation of the sensing instrument 602 to determine a fluid pressure. As an example of the calibration performed by the calibrator 620 with respect to example Equation 14, the sensing instrument 602 is exposed to known fluid pressures (e.g., known fluid internal fluid pressures $p_i$). The different pressures to which the sensing instrument 602 is exposed cause the sensor carrier 608 and the sensors 606 disposed therein or coupled thereto to expand a certain amount at each known pressure value. Expansion of the sensors 606 at the known pressures affects the electrical properties of the sensors 606, which can affect, for example, the current flowing through the sensors 606. The circuit 610 records the current readings for the sensors 606 at each known pressure and transmits the data to the calibrator 620 of the controller 614. The calibrator 620 builds a table correlating the known pressures with the current readings taken by the circuit 610 from the deformed sensors 606 at each known pressure and plots the pressures versus the current readings.

Figure 7:
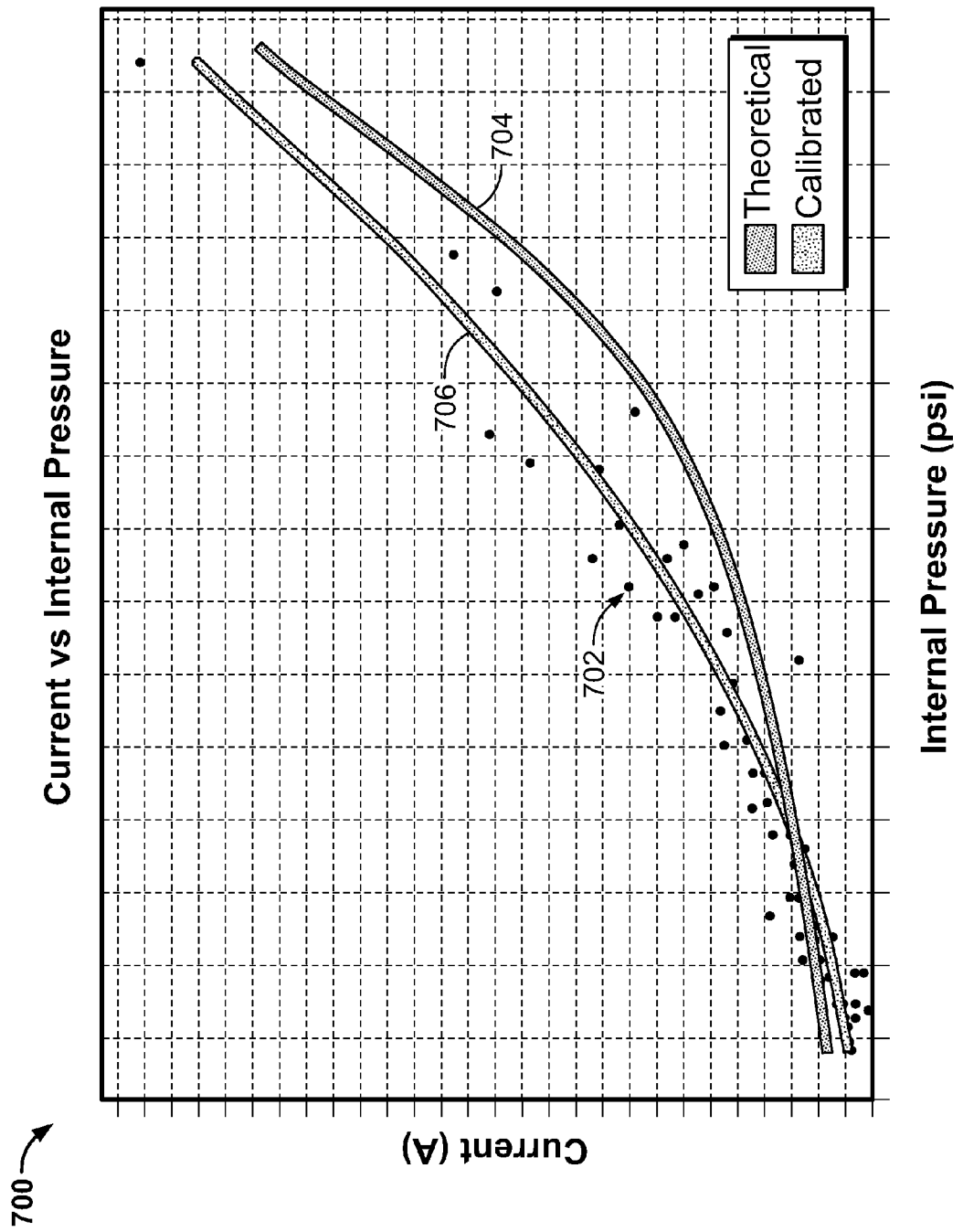
FIG. 7 is an example plot of current versus pressure from data collected using the example sensing instrument of FIG. 2 and processed using the example control system of FIG. 6.

FIG. 7 is an example plot 700 of internal pressure of a fluid flowing through a sensing instrument versus current recorded at each pressure by a circuit, as represented by data points 702. In some examples, the plot 700 is created by the calibrator 620 of FIG. 6 based on the current measurements recorded by the circuit 610 for a sensor 606 of the sensing instrument 602 as fluid flows past the sensor 606 at known pressures. In some examples, the calibrator 620 plots a theoretical curve 704 on the plot 700, where the theoretical curve 704 is found using example Equation 14 as a theoretical model, i.e., $$I = \frac{VA(12EIL)}{\rho \int_0^L \sqrt{(12EIL)^2 + (Fx(L-x)(L-2x))^2} \, dx}. \quad \text{(Eq. 14)}$$

The theoretical curve 704 represents expected pressure versus current values using the theoretical model (e.g., Equation 14).

The calibrator 620 also determines a best fit curve 706 based on the data points 702. The best fit curve 706 can be used to calibrate example Equation 14, or the theoretical model. As illustrated in FIG. 7, in some examples, the theoretical curve 704 and the best fit curve 706 differ from one another at one or more points along the plot 700. The calibrator 620 adjusts or modifies one or more variables in example Equation 14 based on the best fit curve 706 so that Equation 14 accounts for the observed behavior of the sensor 606 as represented by the data points 702.

For example, the theoretical curve 704 may be plotted using an expected resistivity ρ for the sensor 606 of 0.4 ohms. However, the sensor 606 may have been produced with a resistivity ρ of 0.5 ohms. The calibrator 620 accounts for differences between the results obtained using the theoretical model (e.g., expected pressure versus current calculated from example Equation 14) and the observed behavior of the sensor 606 as represented by the data points 702 and the best fit curve 706. For example, the calibrator 620 may adjust the resistivity variable ρ of Equation 14 and/or one or more other variables of Equation 14. Thus, the calibrator 620 generates a calibrated Equation 14, or a calibrated model relating the current measurements and internal pressure.

In some examples, the calibrator 620 plots internal fluid pressure versus voltage measurements collected by the circuit 610 from the sensor 606. In such examples, the calibrator 620 updates or calibrates a model equation relating voltage measurements and internal fluid pressure. In other examples, the calibrator 620 plots length of the sensor 606 (e.g., in millimeters) at known internal fluid pressures. A best fit curve can be calculated to adjust or calibrate an equation for determining elongation of the sensor 606 as a result of deformation (e.g., Equation 11). In further examples, the calibrator 620 plots radial expansion of the sensor carrier 608 versus known internal pressures. A best fit curve can be calculated to calibrate an equation for determining radial expansion of the sensor carrier 608 (e.g., Equation 8). Thus, the calibrator 620 accounts for observed behavior of the sensors 606 and/or the sensor carrier 608 and updates the model equations to more accurately predict, for example, fluid pressure based on current or voltage measurements recorded during operation of the sensing instrument 602.

The controller 614 uses the calibrated equations (e.g., the calibrated example Equation 14) to determine a pressure of a fluid flowing through the pipe 604 when the sensing instrument 602 is coupled to the pipe 604. The example controller 614 includes a pressure calculator 622. The pressure calculator 622 uses the calibrated equations; the current or voltage measurements recorded by the circuit 610 from the sensor(s) 606 when the sensing instrument 602 is coupled to the pipe 604 and exposed to a fluid flowing therethrough; and/or the material deformation data stored by the material selector 616 for the material of the sensor(s) 606 to calculate or predict a pressure of the fluid flowing through the pipe 604.

For example, the pressure calculator 622 can solve for fluid pressure using the calibrated equations and the current or voltage measurements collected by the sensor(s) 606. The pressure calculator 622 can also analyze variability between the current or voltage measurements recorded by the sensor(s) 606 and received by the controller 614. For example, a signal representing current readings collected by the sensor(s) 606 at a pressure of 120 psi differs with respect to amplitude and frequency as compared to a signal collected by the sensor(s) 606 at a pressure of 40 psi. The amplitude of the signal (e.g., how much the signal varies) and the frequency of the signal (e.g., how quickly the signal changes) can be used by the pressure calculator 622 in determining the actual fluid pressure. In other examples, signal noise is extracted and analyzed by the pressure calculator 622, or more generally the controller 614, with respect to amplitude and frequency. Also, the pressure calculator 622 can account for discrepancies between data collected by two or more of the sensors 606 based on information about the position and/or orientation of the respective sensors 606. Such signal processing analyses can be used to increase accuracy in the pressure values determined by the pressure calculator 622 and/or to further calibrate the equations. In some examples, the pressure calculator 622 employs one or more types of signal or data processing analyses to calculate the fluid pressure.

Also, in some examples, the calibrator 620 calibrates a theoretical model for determining fluid temperature based on current or voltage measurements collected from the sensor 606 at known fluid temperatures. As disclosed above, changes in temperature affect a resistivity of the sensor 606, which affects the measurable voltage or current. Thus, a similar analysis using current or voltage measurements recorded by the circuit 610 as disclosed with respect to determining pressure may be performed to determine fluid temperature. The example controller 614 includes a temperature calculator 624. The temperature calculator 624 uses the calibrated equations and the current or voltage measurements recorded by the circuit 610 from the sensor(s) 606 when the sensing instrument 602 is coupled to the pipe 604 and exposed to a fluid flowing therethrough to calculate or predict a temperature of the fluid flowing through the pipe 604. To determine the temperature, the temperature calculator 624 can use one or more signal or data processing techniques such as the analysis of signal amplitude and frequency and/or signal noise extraction disclosed above with respect to the determination of pressure by the pressure calculator 622.

Thus, the example system 600 determines pressure and/or temperature of a fluid flowing through the pipe 604 based on current or voltage measurements collected from the sensor(s) 606 of the sensing instrument 602 and material deformation behavior of the sensors(s) as fluid passes by the sensors(s) 606. The example system 600, including the controller 614, uses calibrated models that account for observed behavior of the sensor(s) 606 at known pressures or temperatures to more accurately determine the fluid pressure and/or temperature when the sensing instrument 602 is exposed to a fluid flowing through the pipe 604.

Although the example system 600 including the example sensing instrument 602 of FIG. 6 (e.g., the sensing instrument of FIGS. 2-5) is disclosed above as providing pressure and/or temperature measurements, in some examples, the sensing instrument 602 can be configured to provide only, for example, temperature measurements. In examples where the sensing instrument 602 only measures temperature, the temperature measurements can be obtained without deformation of the sensor(s) 606 and/or the sensor carrier 608 (e.g., the sensor carrier 206 of FIG. 2-5). Because resistivity $\rho$ of the sensor(s) 606 depends on temperature, the resistance R of the sensor(s) 606 will change as a result of changes in temperature regardless of deformation of the sensor(s) 606 (e.g., where $R=(\rho L)/A$) (Eq. 13)). Thus, although changes in a length or cross-sectional area of the sensor(s) 606 can be used to measure temperature due to the effect of deformation on the resistance R of the sensor(s) 606, in some examples, temperature can be measured without deformation of the example sensor(s) 606 by considering changes in resistivity $\rho$ due to temperature changes.

Further, in examples where the sensing instrument 602 is used to measure fluid pressure and temperature, some of the sensor(s) 606 can be temperature-only sensor(s) 606 while the other sensor(s) are used to obtain pressure measurements. For example, the temperature-only sensor(s) 606 can include one or more sensor rings coupled to the sensor carrier 608 proximate to ends of a housing of the sensing instrument 602 (e.g., at the first and second flanges 212, 214 of the housing 204 of FIGS. 2, 4, 5). The one or more sensor rings 606 are separate from the sensor(s) 606 disposed, for example, longitudinally along the sensor carrier 608. Such a sensor arrangement would provide for physical decoupling of the temperature effects from the pressure effects (as compared to, for example, decoupling of the pressure data from the temperature data during signal processing).

For example, the deformation of the longitudinally disposed sensor(s) 606 due to fluid pressure can be used to determine fluid pressure based on voltage or current changes resulting from the deformation. Temperature can be measured from the temperature-only sensor ring(s) 606 disposed near the ends of the sensor carrier 608, where expansion is constrained as a result of the coupling of the sensor carrier 608 to the housing of the sensing instrument 602. Thus, the pressure measurements calculated by the pressure calculator 622 from data collected by the longitudinally disposed sensor(s) 606 and transmitted to the controller 614 are based on deformation of the longitudinally disposed sensor(s) 606 from the fluid pressure, while the temperature measurements calculated by the temperature calculator 624 from data collected by the sensor ring(s) 606 and transmitted to the controller 614 are based on changes in resistivity of the sensor ring(s) 606. Therefore, in some examples, fluid pressure effects can be physically decoupled from fluid temperature effects based on the arrangement of the sensors 606 to reduce signal processing time and provide for accuracy in discerning the fluid pressure measurements from the temperature measurements.

The fluid pressure and/or temperature output(s) determined by the controller 614 can be displayed to an operator via the GUI 618. In some examples, the outputs displayed via the GUI 618 can complement the visual observations of the expansion of the sensor carrier 608 by the operator when, for example, a housing of the sensing instrument 602 is open (e.g., as in the housing 204 of the sensing instrument 200 of FIGS. 2-5). For example, the visual observations of the operator with respect to the expansion of the sensor carrier 608 can indicate to the operator that the fluid may be flowing through the pipe 604 at a higher than desired pressure, which can be confirmed by the pressure values output by the controller 614 via the GUI 618.

Although the example sensing instrument 602 is shown in FIG. 6 as operatively coupled to the controller 614, in some examples, the sensing instrument 602 is a stand-alone tool that provides pressure and/or temperature readings without being connected to the controller 614. In such examples, the circuit 610 includes a logic chip to perform the conversion of current or voltage measurements to fluid pressure and/or temperature measurements. Also, in such examples, the sensing instrument 602 includes a communication wire or chip to transmit the outputs to an operator device (e.g., via Bluetooth, radio frequency communication, Wi-Fi, etc.). In some such examples, the sensing instrument 602 can include a power source such that the sensing instrument 602 is a wireless device.

While an example manner of implementing the example system 600 is illustrated in FIG. 6, one or more of the elements, processes and/or devices illustrated in FIG. 6 may be combined, divided, re-arranged, omitted, eliminated and/or implemented in any other way. Further, the example sensing instrument 602, the example sensors(s) 606, the example circuit 610, the example power supply 612, the example controller 614, the example material selector 616, the example calibrator 620, the example pressure calculator 622, the example temperature calculator 624, the example graphical user interface 618 and/or, more generally, the example system 600 of FIG. 6 may be implemented by hardware, software, firmware and/or any combination of hardware, software and/or firmware. Thus, for example, any of the example sensing instrument 602, the example sensors(s) 606, the example circuit 610, the example power supply 612, the example controller 614, the example material selector 616, the example calibrator 620, the example pressure calculator 622, the example temperature calculator 624, the example graphical user interface 618 and/or, more generally, the example system 600 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensing instrument 602, the example sensors(s) 606, the example circuit 610, the example power supply 612, the example controller 614, the example material selector 616, the example calibrator 620, the example pressure calculator 622, the example temperature calculator 624, the example graphical user interface 618 and/or, more generally, the example system 600 of FIG. 6 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 600 of FIG. 6 may include one or more elements, processes and/or devices in addition to, or instead of, those illustrated in FIG. 6, and/or may include more than one of any or all of the illustrated elements, processes and devices.

Figure 8:
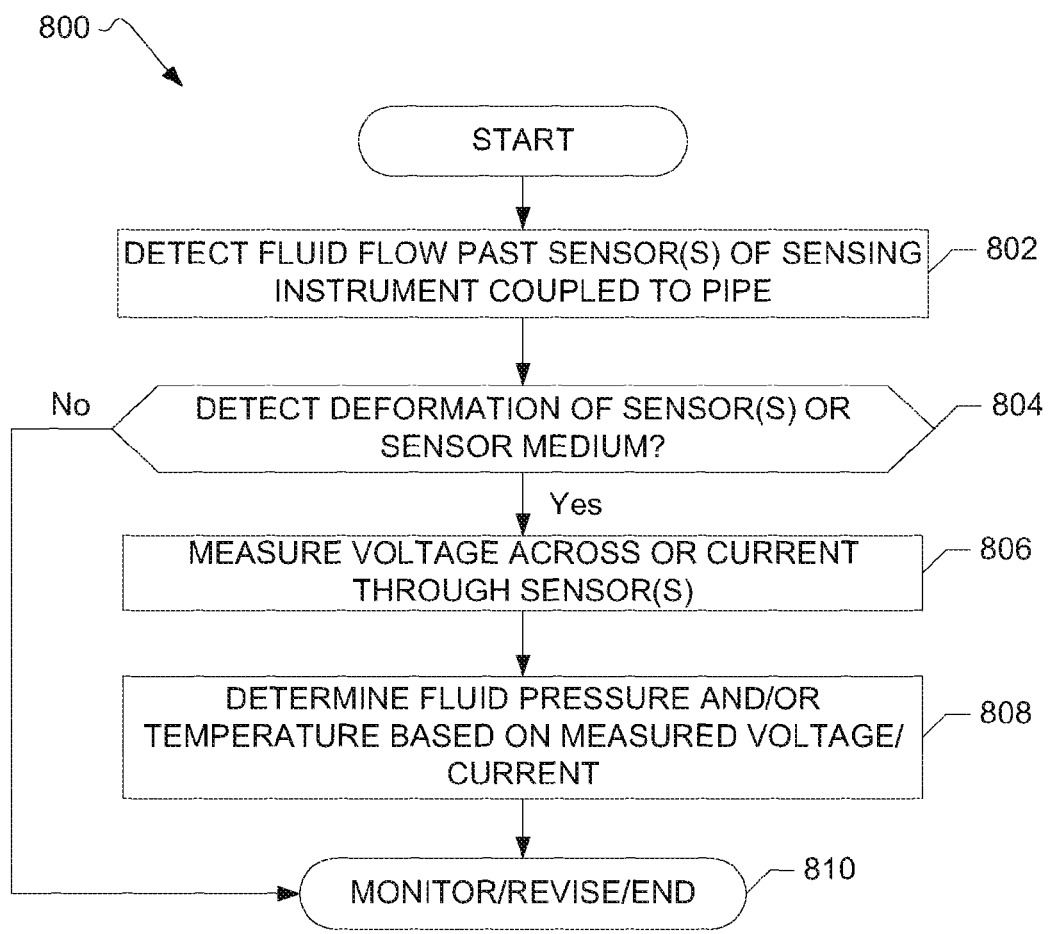
FIG. 8 is a flow diagram of an example method that may be executed to implement the example control system of FIG. 6.

FIG. 8 illustrates a flowchart representative of an example method 800 that can be implemented to predict a fluid pressure and/or temperature using a flow-through sensing instrument (e.g., the sensing instrument 200, 602 of FIGS. 2-6) coupled to or substantially integrated with a pipe (e.g., the pipe 400, 604 of FIGS. 4-6). The example method 800 begins with detecting a fluid flow past one or more sensors (e.g., the sensors 202, 606 of FIGS. 2-6) of the sensing instrument when the sensing instrument is coupled to the pipe (block 802). The detection of the fluid flow past the sensors of the instrument can be detected by one or more circuits or circuit boards (e.g., the circuit 210, 610 of FIGS. 2-6) of the sensing instrument, including one or more circuits coupled to the sensor(s).

The example method 800 includes a determination of whether deformation of the sensor(s) and/or a sensor carrier in which the sensor(s) are disposed or coupled thereto (e.g., the sensor carrier 206, 608 of FIGS. 2-6) is detected in response to the fluid flow past the sensor(s) and the sensor carrier (block 804). In the example method 800, the deformation is in response to the fluid flow past the sensor(s) and the sensor carrier and, in particular, fluid forces exerted on the sensor(s) and/or the sensor carrier. The deformation can be detected by, for example, the circuit(s) of the sensing instrument. The sensor(s) and the sensor carrier include an elastically deformable material. Pressure of the fluid flowing through the sensing instrument can cause the sensor(s) and the sensor carrier to deform (e.g., expand) as a result of forces acting upon the sensor carrier. In the example method 800, changes in the electrical properties of the sensors as a result of the deformation, such as resistance and conductance, are used to determine a pressure and/or a temperature of the fluid.

If a deformation of the sensor(s) and/or the sensor carrier is detected, the example method 800 includes measuring a voltage across the sensor(s) or a current drawn through the sensor(s) (block 806). In some examples, a power source coupled to the sensing instrument (e.g., the power supply 612) provides the voltage difference across the sensors. In other examples, the sensing instrument includes a power supply. The voltage and/or current can be measured by the circuit(s) of the sensing instrument.

In some examples, the sensors measure voltage or current before and/or after a fluid flows through the sensing instrument based on a command from a controller (e.g., the controller 614). In such examples, the sensing instrument substantially continuously monitors voltage or current during operation of the sensing instrument regardless of whether fluid is flowing through the sensing instrument. In such examples, the deformation of the sensor(s) and/or the sensor carrier can be detected based on a change (e.g., a sudden change or a change within a predetermined threshold amount) of the voltage and/or current readings that may be indicative of deformation of the sensor(s) and/or the sensor carrier as a result of exposure of the sensing instrument to fluid. The sensing instrument can collect voltage or current measurements until the controller instructs the sensing instrument to stop collecting the data. Thus, the example method 800 can collect voltage or current measurements for a period of time including before, during, and/or after fluid flows through the sensing instrument.

The example method 800 includes determining a pressure of the fluid and/or a temperature of the fluid based on the voltage or current measurements (block 808). In some examples of the method 800 of FIG. 8, the voltage or current measurements are recorded by the circuit(s) of the sensing instrument and transmitted to a controller (e.g., the controller 614 of FIG. 6). The controller includes one or more calculators (e.g., the pressure calculator 622 and/or the temperature calculator 624 of FIG. 6). In the example method 800, the calculator(s) of the controller determine the fluid pressure and/or temperature based on the voltage or current measurements received from the sensing instrument before, during, and/or after fluid flows through the sensing instrument.

For example, the calculator(s) use one or more models or equations (e.g., the example Equations 1-14, above) to calculate, predict, or estimate the fluid pressure and/or temperature. In some examples, the models or equations used by the calculator(s) are calibrated or adjusted based on previously recorded voltage or current data from the sensor(s) collected at known pressures or temperatures. The calibration of the equations can be performed by a calibrator of the controller (e.g., the calibrator 620 of FIG. 6).

In implementing the equations to determine fluid pressure, the calculator(s) also account for the deformation of the sensor(s) through constants and/or variables such as the Young's modulus for the material of the sensor(s), resistivity of the sensor(s), and forces exerted on the sensors(s) by fluid. Data regarding the material properties of the sensor(s) and/or a deformation behavior of the sensor material under known forces may be stored in a material selector of the controller (e.g., the material selector 616 of FIG. 6). The calculator(s) can reference the data related to the sensor material properties and/or behavior during execution of one or more of the models to determine fluid pressure and/or temperature.

In the example method 800, the controller can display the fluid pressure and/or temperature value(s) via a graphical user interface (e.g., the GUI 618 of FIG. 6) of a device associated with the controller. In other examples of the method 800 of FIG. 8, the sensing instrument includes a logic chip, which performs the conversion of the voltage or current measurements to pressure and/or temperature values. In such examples, the sensing instrument determines the fluid pressure and/or temperature and transmits the pressure and/or temperature value(s) for display via a graphical user interface of a user device.

In the example method 800, the sensing instrument, including the circuits of the sensing instrument, continue to monitor fluid flow past the sensors and any resulting deformation (block 810). As part of the monitoring, the example method 800 can include revising and/or updating the equations used to determine the fluid pressure and/or temperature. For example, the fluid pressure and/or temperature measurements determined by the example method 800 (e.g., at block 808) can be used to update or calibrate the models or equations for determining pressure and/or temperature. In other examples, the pressure and/or temperature values determined via the example method 800 may be averaged over time, monitored for a period of time, and/or updated or adjusted based on the monitoring. Also, in examples where the deformation of the sensor(s) and/or the sensor carrier is not detected, the example method 800 can include continued monitoring of the fluid flowing through the pipe until a time when deformation is detected (e.g., and blocks 806 and 808 of the example method 800 are implemented). As also disclosed above, the example method 800 can collect voltage or current readings whether or not a fluid is flowing through the sensing instrument to substantially continuously provide pressure and/or temperature measurements during operation of the sensing instrument.

Thus, the example method 800 determines or estimates a pressure and/or a temperature of a fluid flowing through a pipe via a sensing instrument coupled to or integrated with the pipe. In particular, the example method 800 provides for a conversion of voltage or current measurements collected from sensors exposed to the fluid as the fluid flows through the pipe and past the sensors. In some examples, the sensing instrument substantially continuously collects voltage or current readings whether or not a fluid is flowing through the sensing instrument and, thus, can provide for pressure and/or temperature measurements over a period of time in which fluid is and is not flowing through the sensing instrument. The example method 800 uses deformation of the sensor(s) or the sensor carrier as an indicator of changes in electrical properties of the sensor(s), which result in changes in voltage or current measurements. One or more models or equations that account for the material deformation and the voltage or current measurements are implemented to determine the pressure and/or temperature of the fluid flowing through the pipe.

The flowchart of FIG. 8 is representative of example methods that may be used to implement the example system 600 of FIG. 6. In this example, the method may be implemented using machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example system 600 may alternatively be used. For example, the order of execution of the blocks may be changed, and/or some of the blocks described may be changed, eliminated, or combined.

As mentioned above, the example method of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
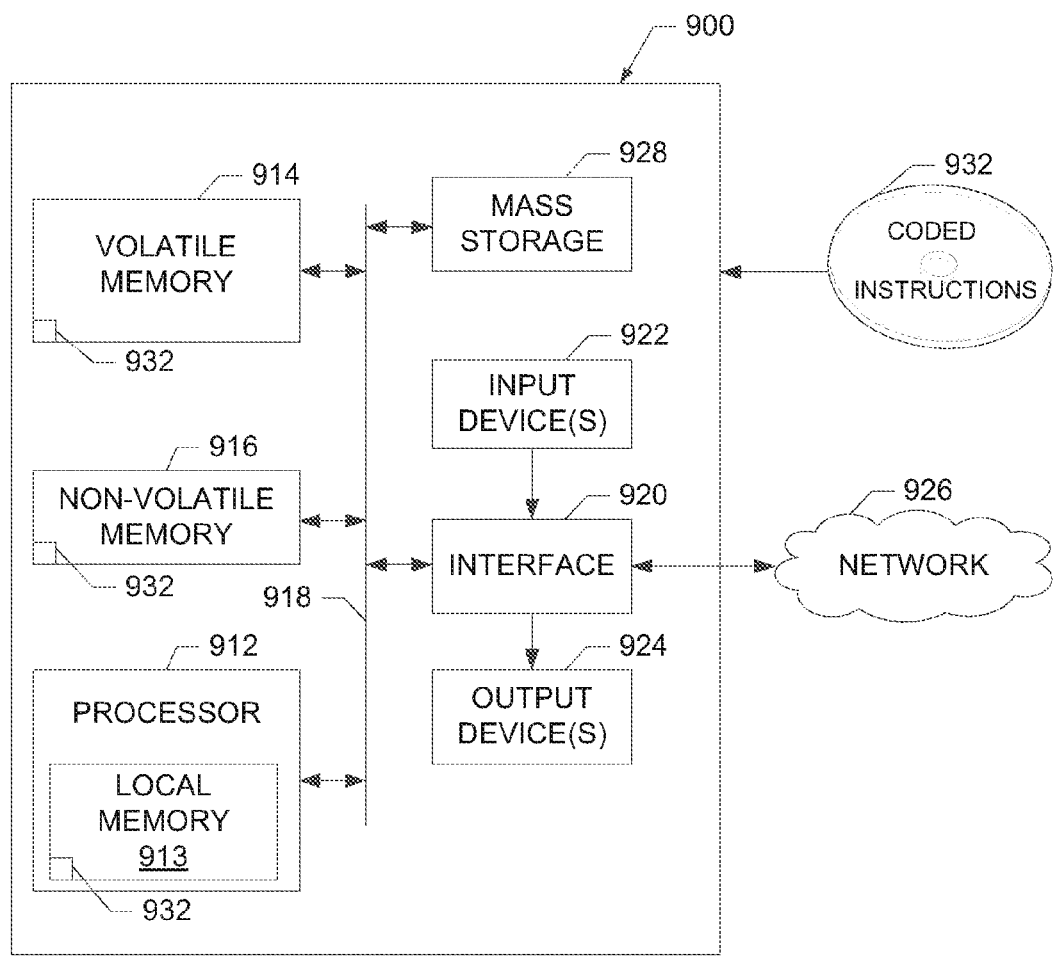
FIG. 9 is a diagram of an example processor platform that may be used to carry out the example method of FIG. 8 and/or, more generally, to implement the example control system of FIG. 6.

FIG. 9 is a block diagram of an example processor platform 900 capable of executing instructions to implement the method of FIG. 8 and the example system 600 of FIG. 6. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the method of FIG. 8 may be stored in the mass storage device 928, in the volatile memory 914, in the non-volatile memory 916, and/or on a removable tangible computer readable storage medium such as a CD or DVD.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

From the foregoing, it will be appreciated that the above disclosed systems, methods, and apparatus provide for a determination of a pressure and/or a temperature of a fluid flowing through a pipe via a sensor that is substantially integrated with the pipe. In particular, the disclosed sensing instrument and related systems and methods convert voltage or current measurements from an elastically deformable sensor into fluid pressure and/or temperature readings. The disclosed examples recognize changes in shapes of the deformable sensor material due to fluid forces and resulting effects on the electrical properties of the sensor. The disclosed examples efficiently translate the changes in the electrical properties to fluid pressure and/or temperature readings.

An example sensing apparatus disclosed herein is coupled to the pipe such that the example apparatus and the pipe share a common fluid flow path. Thus, disclosed examples minimize disruption to the fluid flow by substantially integrating the apparatus within the piping system via coaxial alignment of the apparatus and the pipe. Further, the example apparatus disclosed herein can have a shape or cross-section that is substantially similar to that of the pipe, thereby reducing an amount of space required to couple the example apparatus to the pipe and/or piping system in which the pipe is located. The disclosed examples collect data along multiple axes along the fluid flow path rather than only along a single axis (e.g., a longitudinal axis). Thus, the disclosed examples provide for a more accurate measure of the pressure and/or temperature of the fluid as compared to measurements collected along a single longitudinal flow path.

Also, the disclosed examples use equations or models that account for behavior of sensors at known pressures, thereby further increasing the accuracy of the resulting fluid pressure and/or temperature measurements. Further, expansion or deformation of the sensors can be viewed by an operator to provide for visual indications of fluid pressure that can be verified by execution of the disclosed example models. Also, the disclosed apparatus can be operatively coupled to a control system for processing of the data or, in some examples, can operate a stand-alone sensor that provides pressure and/or temperature estimates of a fluid flowing through a pipe without interfering with the fluid flow.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a housing including an opening to provide a fluid flow path, the fluid flow path to be coaxially aligned with a fluid flow path of a pipe when the housing is coupled to the pipe;
   a sensor disposed in the housing, the sensor including an electrically conductive deformable material; and
   a carrier disposed in the housing, the sensor coupled to the carrier, the carrier including an electrically insulating deformable material.

2. The apparatus of claim 1, wherein the carrier has a cylindrical shape and wherein an inner diameter of the carrier is aligned with an inner diameter of the pipe when the housing is coupled to the pipe.

3. The apparatus of claim 1, wherein the sensor is embedded in the carrier.

4. The apparatus of claim 1, wherein the carrier includes a thermally insulating material.

5. The apparatus of claim 1, wherein the sensor extends longitudinally along the housing.

6. An apparatus comprising:
   a housing including an opening to provide a fluid flow path, the fluid flow path to be coaxially aligned with a fluid flow path of a pipe when the housing is coupled to the pipe; and
   a plurality of sensors disposed in the housing about a central axis of the housing, the sensors including an electrically conductive deformable material.

7. The apparatus of claim 1, further including a circuit disposed in the housing, the circuit operatively coupled to the sensor.

8. The apparatus of claim 1, wherein the sensor includes nickel titanium.

9. A method for sensing physical changes in a fluid flowing through a pipe, the method comprising:
   detecting a change in a shape of a sensor coupled to the pipe from a first shape to a second shape in response to the fluid flow, the second shape expanded relative to the first shape;
   measuring one of a voltage across or a current flowing through the sensor; and
   determining a pressure of the fluid based on the change in the shape of the sensor and one of the voltage or the current.

10. The method of claim 9, further including determining a temperature of the fluid based on one of the voltage or the current.

11. The method of claim 9, wherein the sensor is coupled to the pipe via a housing, the housing including an aperture defined therein, a diameter of the aperture being substantially similar to an inner diameter of the pipe.

12. The method of claim 11, wherein an opening of the housing is aligned with an opening of the pipe when the housing is coupled to the pipe.

13. The method of claim 9, wherein the determining of the pressure of the fluid is based on a model and further including calibrating the model based on a voltage across or current flowing through the sensor at a known pressure.

14. An apparatus comprising:
   a sensor configured to be coupled to a pipe, wherein the sensor is configured to change from a first shape to a second shape when a fluid flows through the sensor from the pipe;
   a circuit operatively coupled to the sensor, the circuit to measure one of a voltage across or a current through the sensor having the second shape; and
   a controller including a processor, the controller to determine at least one of a pressure or a temperature of the fluid in the pipe based on one of the voltage or the current and the second shape.

15. The apparatus of claim 14, wherein the first shape has a first cross-sectional area and the second shape has a second cross-sectional area, the second cross-sectional area larger than the first cross-sectional area.

16. The apparatus of claim 14, further including a power source operatively coupled to the sensor.

17. The apparatus of claim 14, further including a database to store a property of a material of the sensor, the controller to determine the at least one of the pressure or the temperature based on the property of the material.

18. The apparatus of claim 14, wherein the sensor is disposed in a carrier, the sensor including a material being more flexible than a material of the carrier.

19. The apparatus of claim 18, wherein the carrier is to form a continuation wall of the pipe when the sensor is coupled to the pipe.

* * * * *